United States Patent [19]

Tsai

[11] Patent Number: 5,656,905
[45] Date of Patent: Aug. 12, 1997

[54] MULTI-DEGREE-OF-FREEDOM MECHANISMS FOR MACHINE TOOLS AND THE LIKE

[76] Inventor: Lung-Wen Tsai, 8737 Hickory Bend Trail, Potomac, Md. 20854

[21] Appl. No.: 415,851

[22] Filed: Apr. 3, 1995

[51] Int. Cl.⁶ ..................................... B25J 15/02
[52] U.S. Cl. ................. 318/568.21; 318/568.11; 318/560; 318/568.19; 318/574; 901/8; 901/15; 901/28; 901/41; 901/50; 74/479.01
[58] Field of Search ............... 318/568.21, 568.11, 318/560, 568.19, 574; 901/8, 14, 15, 28, 19, 31, 36, 41, 50, 16; 74/479 B, 479 PF, 469, 479 M, 479 MF

[56] References Cited

U.S. PATENT DOCUMENTS 5,309,646 5/1994 Randolph, Jr. et al. ............ 901/8
5,418,611 5/1995 Huang et al. ...................... 901/15

*Primary Examiner*—Karen Masih

[57] ABSTRACT

A new generation of hybrid form multi-axis machine tools is described. The hybrid machine tools comprise a position mechanism and an orientation mechanism. Both mechanisms are three-DOF parallel mechanisms that can be connected either in series to form a hybrid parallel-serial manipulator, or in parallel to form a cooperating machine. The position mechanism is used for manipulating the position and the orientation mechanism is used for manipulating the orientation of an object. Six-axes machining of a workpiece is achieved by coordinating the motions of the position and orientation mechanisms. This approach has several important advantages. First of all, a high stiffness, low inertia, and high speed machine tool is realized by using the parallel construction. Secondly, its direct and inverse kinematic solutions could be solved in closed forms which would greatly simplify the control and path planning problems. Thirdly, it has a relatively large workspace in comparison to fully parallel platform manipulators. Fourthly, its position and orientation are completely decoupled. Lastly, it utilizes mostly revolute joints which can be precisely made at low cost.

12 Claims, 5 Drawing Sheets

MULTI-DEGREE-OF-FREEDOM MECHANISMS FOR MACHINE TOOLS AND THE LIKE

TECHNICAL FIELD

This invention relates in general to multiple degree-of-freedom (DOF) hybrid manipulators and in particular to low inertia, high stiffness, and high speed machine tools for multi-axis machining.

BACKGROUND ART

Conventional machine tools typically use a linear x–y table for mounting a workpiece and a z-axis for mounting a spindle. The x–y table is usually very heavy, and its operating speed is relatively slow. The machining capability of such a conventional machine tool is often limited to straight lines or simple two-dimensional contours. It is essential that non-conventional machine tools be developed for free-form three-dimensional machining of general shapes.

The Stewart platform has been studied extensively for use as a flight simulator and as a parallel manipulator (Stewart, D. 1965, "A Platform with Six Degrees of Freedom," Proc. Institute of Mechanical Engr., London, England, Vol. 180, pp. 371–386). Other variations of the Stewart platform have also been proposed. Kohli et al. studied several six-DOF parallel manipulators which are driven by base-mounted rotary-linear actuators (Kohli, D., Lee, S. H., Tsai, K. Y., and Sandor, G. N., 1988, "Manipulator Configurations Based on Rotary-Linear (R-L) Actuators and Their Direct and Inverse Kinematics," ASME Journal of Mechanisms, Transmissions, and Automation in Design, Vol. 110, pp. 397–404). Hudgens and Tesar introduced a six-DOF parallel micromanipulator (Hudgens, J. C., and Tesar, D., 1988, "A Fully-Parallel Six Degree-of-Freedom Micromanipulator: Kinematic Analysis and Dynamic Model," Trends and Developments in Mechanisms, Machines, and Robotics, Proc. of the 20th ASME Biennial Mechanisms Conference, DE-Vol. 15-3, pp. 29–37). Pierrot, et al. studied a parallel manipulator using spatial parallelograms (Pierrot, F., Reynaud, and Fournier, A., 1990, "DELTA: A Simple and Efficient Parallel Robot," Robotica, Vol. 8, pp. 105–109). Pierrot, et al. introduced a high-speed six-DOF parallel manipulator (Pierrot, F., Fournier, A., and Dauchez, P., 1991, "Toward a Fully Parallel 6 DOF Robot for High-Speed Applications," Proc. of the 1991 IEEE International Conference on Robotics and Automation, pp. 1288–1293). Most of these six-DOF parallel manipulators consist of six limbs connecting a moving platform to a fixed base by spherical joints. These six-limbed manipulators suffer the following disadvantages:

1. Their direct kinematics are very difficult to solve.

2. Position and orientation of the moving platform are coupled.

3. Their workspace is relatively small.

4. Spherical joint is difficult to manufacture with high precision.

Note that the only six-limbed, six-DOF parallel manipulators for which closed-form direct kinematic solutions have been reported in the literature are special forms of the Stewart platform (Nanua, P., Waldron, K. J., and Murthy, V., 1990, "Direct Kinematic Solution of a Stewart Platform," IEEE Transactions on Robotics and Automation, Vol. 6, pp. 438–444; Grffis, M., and Duffy, J., 1989, "A Forward Displacement Analysis of a Class of Stewart Platforms," Journal of Robotic Systems, Vol. 6, pp. 703–720; Innocenti, C., and Parenti-Castelli, V., 1990, "Direct Position Analysis of the Stewart Platform Mechanism," Mechanism and Machine Theory, Vol. 25, pp. 611–612). In these special forms, pairs of spherical joints are concentric on either just the platform or both the base and the platform. However, as mentioned by Griffs and Duffy, pairs of concentric spherical joints may present design problems. As to the general Stewart platform, researchers have to resort to numerical techniques for the solutions. Innocenti and Parenti-Castelli developed an exhaustive search algorithm to solve the direct kinematics problem of the general Stewart platform (Innocenti, C., and Parenti-Castelli, V., 1993, "Forward Kinematics of the General 6—6 Fully Parallel Mechanism: An Exhaustive Numerical Approach Via a Mono-Dimensional Search Algorithm," ASME Journal of Mechanical Design, Vol. 115, pp. 932–937). Raghavan applied the continuation method and found that the general Stewart platform has 40 direct kinematics solutions (Raghavan, M., 1993, "The Stewart Platform of General Geometry Has 40 Configurations," ASME Journal of Mechanical Design, Vol. 115, pp. 277–282).

Although parallel manipulators have been studied thoroughly, most of the studies have concentrated on their applications as a robot manipulator. Recently, Giddings and Lewis (1995) introduced a machine tool called the "VARIAX Machining Center" utilizing the Stewart platform construction. Six legs connect a moving platform to a base. The upper and lower ends of each leg are connected to the moving platform and the base by gimbals. A spindle is mounted on the moving platform to cut the workpiece. Each of the six legs houses a ball screw. Individual servo motors drive the ball screws. Extending and retracting of the legs controls the position and orientation of the spindle making 6-axis machining feasible. This machine represents a revolutionary design in the machine tool industry. However, since the machine tool utilizes the Stewart platform construction, it suffers all the problems mentioned above. Although the minimanipulator introduced by Tahmasebi and Tsai (Tahmasebi, F., and Tsai, L. W., 1994, U.S. Pat. No. 5,279,176) contains only three limbs, it was designed for manipulating an object in a relatively small workspace.

SUMMARY OF THE INVENTION

An object of the present invention is to provide a light weight, high speed, and high stiffness hybrid machine tool for multi-axis machining.

Another object of the invention is to provide a machine tool with a decoupled position and orientation characteristic.

Still another object of the invention is to provide a multi-DOF machine tool with closed-form kinematics solutions.

A further object of the invention is to provide a large workspace for a machine tool.

A still further object of the invention is to utilize mostly revolute joints to increase the precision and to reduce the manufacturing cost of a machine tool.

These objects are achieved by providing a hybrid form machine tool with a position mechanism and an independently controlled orientation mechanism. Both mechanisms are three-DOF parallel mechanisms that can be connected in series to form a hybrid parallel-serial manipulator, or in parallel to form a cooperating machine. Multi-axis machining of a workpiece is achieved by coordinating the translation of the position mechanism and the rotation of the orientation mechanism. These and other features of the invention will become more fully understood from the following description of certain preferred embodiments taken together with the accompanying drawings.

DETAILED DESCRIPTION

The Stewart platform and other variations of the Stewart platform contain six limbs (Stewart, Hudgens and Tesar, Pierrot et al., Giddings and Lewis, etc.). As a result, the inverse kinematics of these mechanisms is fairly straight forward while the direct kinematics becomes a very difficult problem. Furthermore, the position and orientation of the moving platform are strongly coupled which makes the motion control and path planning a very complicated task.

For the reasons mentioned in the section entitled "Background Art," the present invention divides a six-DOF manipulator into two decoupled three-DOF mechanisms, one for manipulating the position and the other for manipulating the orientation. These two three-DOF mechanisms can be connected either in series to form a hybrid parallel-serial manipulator or in parallel to form a cooperating machine. Each of the three-DOF mechanisms utilizes the parallel construction with three limbs to achieve light weight, high stiffness and high speed capabilities. In what follows, the preferred embodiments of a three-DOF position mechanism and a three-DOF orientation mechanism will be described. Then, how such mechanisms can be attached together to form a multi-DOF machine tool or a general purpose robot manipulator will be described.

Figure 1:
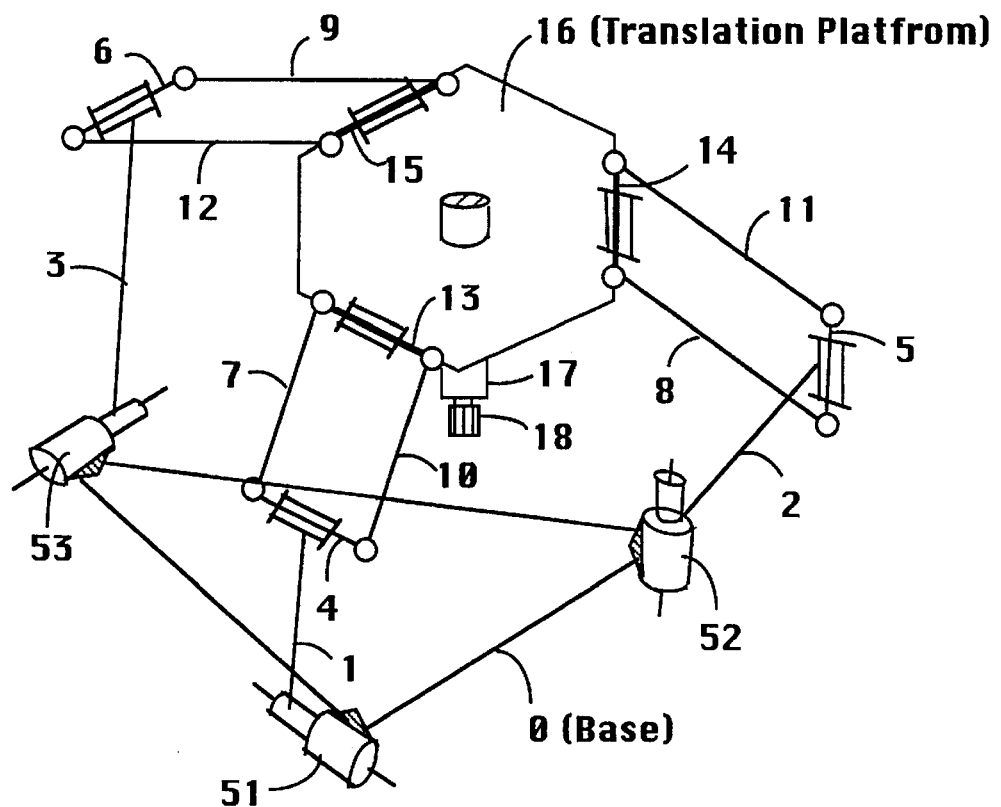
FIG. 1 is a schematic representation of a position mechanism formed in accordance with the invention.
Figure 2:
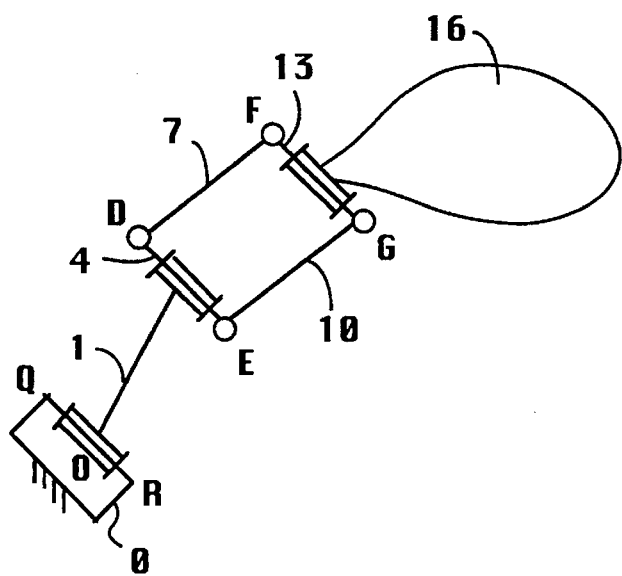
FIG. 2 is a schematic representation of a limb comprising a forearm and a planar four-bar parallelogram.
Figure 3:
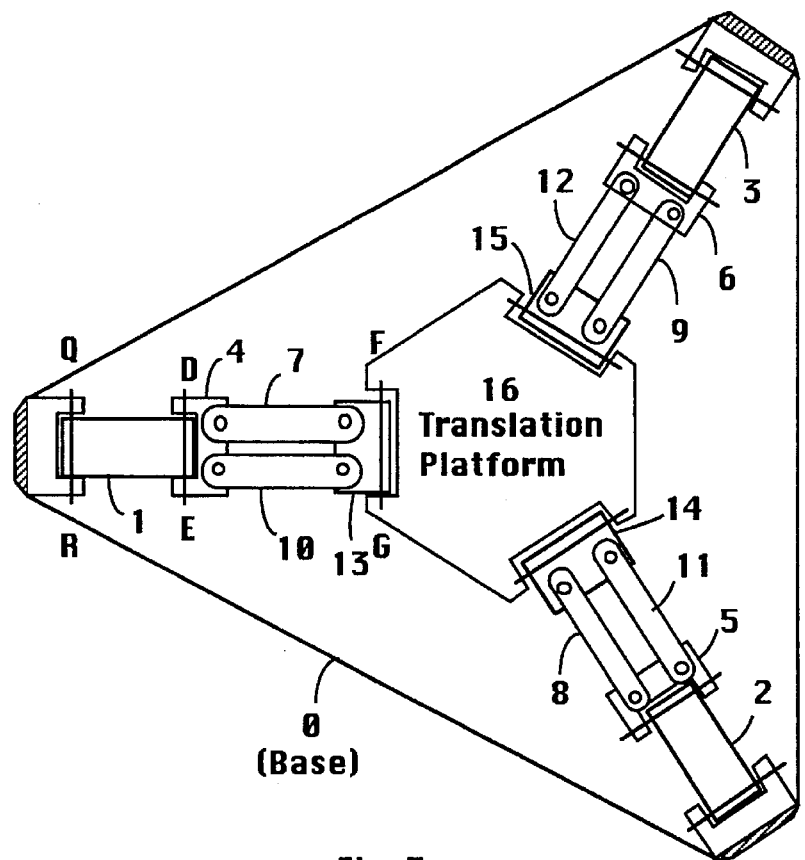
FIG. 3 is the top view of the position mechanism shown in FIG. 1.

Referring to FIGS. 1 through 3 in detail, numeral 0 generally indicates a fixed base and numeral 16 a moving platform. There are three identical limbs connecting the moving platform 16 to the fixed base 0. The moving platform 16 of a position mechanism is called the translation platform. Each limb consists of an upper arm and a forearm.

Each forearm is a single link denoted by the numerals 1, 2, and 3, respectively. Each upper arm comprises a planar four-bar parallelogram: links 4, 7, 10 and 13 for the first limb; 5, 8, 11 and 14 for the second limb; and 6, 9, 12 and 15 for the third limb. The axes of rotation of each parallelogram are parallel to one another while the lengths of its opposite links are equal to each other. The parallelogram and the forearm are connected to each other and to the translation platform 16 and the fixed base 0 by three parallel revolute joints, with their axes of rotation DE, FG, and QR perpendicular to the axes of the four-bar parallelogram. A revolute joint permits two connected members to rotate freely with respect to one another. The axes of rotation of the parallelogram do not necessarily intersect the axes DE and FG as depicted in FIG. 3. Note that when two revolute joint axes intersect at a common point, it is kinematically equivalent to a universal joint. The three limbs are preferably, but not necessarily, separated by 120 degrees at the points of connection with the translation platform 16 and with the fixed base 0 as illustrated in FIG. 3. A spindle 17 as shown in FIG. 1 is attached to the translation platform 16 for mounting a cutting tool 18.

Let F be the degrees of freedom of a mechanism, n the number of links, j the number of joints, $f_i$ the degrees of freedom associated with the $i^{th}$ joint, and $\lambda$ the motion parameter ($\lambda=6$ for spatial mechanisms and $\lambda=3$ for planar and spherical mechanisms). Then, the degrees of freedom of a mechanism is generally governed by the following equation:

$$F = \lambda(n-j-1) + \sum_i f_i$$

For the position mechanism shown in FIG. 1, n=17, j=21, and $f_i$=1, for i=1, 2, ... 21. Hence, $$F=6(17-21-1)+21=-9$$

That is the mechanism is an over constrained mechanism. However, due to the ingenious arrangement of the links and joints, many of the constraints imposed by the joints are redundant and the resulting mechanism does have three degrees of freedom. More importantly, the translation platform performs pure translation with respect to the fixed base. Thus the translation platform will never change its orientation while its position is being varied. This unique characteristic is very useful in many applications such as an x–y–z position device.

Due to the nature of the link arrangement, the useful workspace of the present invention is generally larger than that of fully parallel manipulators discussed in the section entitled "Background Art." The housings of three actuators 51, 52, and 53 are attached on the base platform to drive the lower members (links 1, 2, and 3) or on the translation platform to drive the upper members (links 13, 14, and 15) of the mechanism. In fact, the translation platform and the fixed base can be interchanged at will.

As mentioned above the present invention incorporates a three-DOF position mechanism and a three-DOF orientation mechanism. Three-DOF orientation mechanisms have been used as wrist mechanisms in serial robots. Cincinnati Milacron designed a three-roll wrist mechanism using bevel-gear trains for power transmission (Stackhouse, T., 1979, "A New Concept in Wrist Flexibility," Proceedings of the 9th International Symposium on Industrial Robots, Washington, DC, pp. 589–599). Bendix Corporation designed a roll-bend-roll bevel-gear wrist mechanism (Anonymous, 1982, "Bevel Gears Make Robot's Wrist More Flexible," Machine Design, Vol. 54, No. 18, pp. 55). Chang and Tsai developed a systematic methodology for the enumeration of geared robotic mechanisms (Chang, S. L., and Tsai, L. W., 1990, "Topological Synthesis of Articulated Gear Mechanisms," IEEE Transactions on Robotics and Automation, Vol. 6, No. 1, pp. 97–103). This type of orientation mechanisms may be incorporated in the present invention. However, one major disadvantage for this type of mechanisms is their limited load capacity. This invention improves load capacity by using parallel construction similar to the position mechanism described above.

Figure 4:
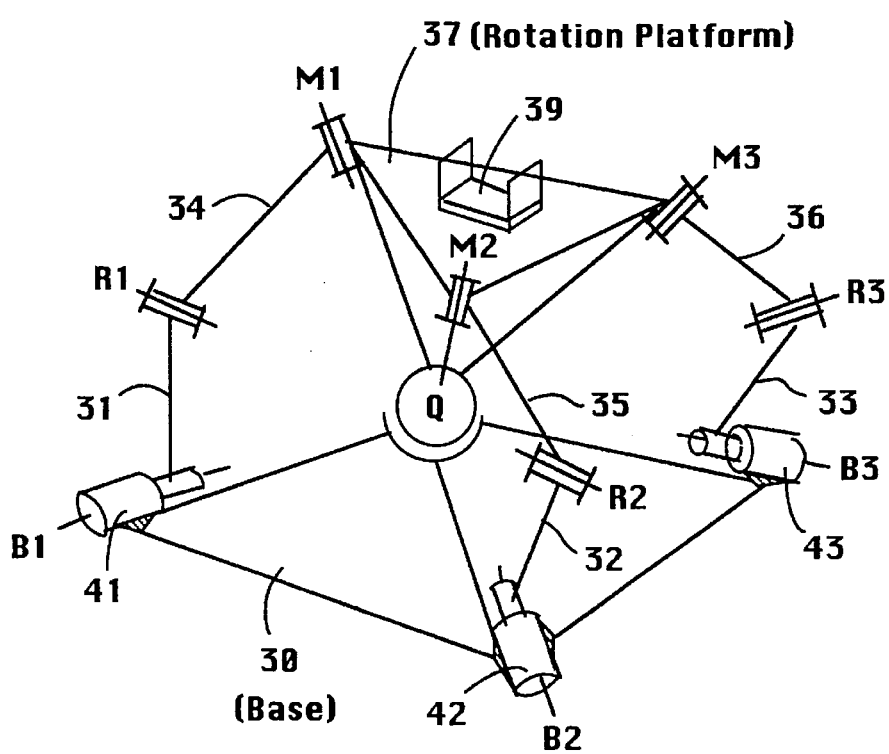
FIG. 4 is a schematic illustration of a three-DOF orientation mechanism in accordance to the invention.

Referring to the orientation mechanism shown in FIG. 4 in detail, numeral 30 indicates a base platform and 37 a moving platform. The moving platform 37 of an orientation mechanism is called the rotation platform. The rotation platform 37 is directly connected to the base platform 30 by a spherical joint centered at point Q. A spherical joint consists of a ball and socket. In addition, the rotation platform 37 is also connected to the base platform 30 by three legs of similar kinematic structure. Each leg consists of two links: an upper member and a lower member. The upper member 34 of the first leg is connected to the rotation platform by a revolute joint denoted as M1; the lower member 31 is connected to the upper member 34 by a second revolute joint R1; furthermore the lower member 31 is connected to the base 30 by a third revolute joint B1. The other two legs are constructed similarly. All the joint axes intersect at the center of the spherical joint Q as depicted in FIG. 4. Since all the joint axes intersect at a common point Q, the mechanism is a spherical mechanism. Applying the above degree-of-freedom equation, yields $$F = 3(n - j - 1) + \Sigma_i f_i = 3(8 - 9 - 1) + 9 = 3$$

Hence, the mechanism is a three-DOF spherical mechanism which can be used for controlling the orientation of an object. The housings of three actuators 41, 42, and 43 are attached to the base platform to drive the lower members (links 31, 32, and 33) of the mechanism. A gripping mechanism 39 is attached to the rotation platform 37 for the purpose of holding a workpiece. Note that when the spherical joint at point Q is removed, the mechanism remains as a three-DOF spherical mechanism which is the more commonly known spherical mechanism (Gosselin, C., and Angeles, J., 1989, "The Optimum Kinematic Design of a Spherical Three-Degree-of-Freedom Parallel Manipulator," ASME Journal of Mechanisms, Transmissions, and Automation in Design, Vol. 111, pp. 202–207; Gosselin, C., and Hamel, J., 1994, "The Agile Eye: A High-Performance Three-Degree-of-Freedom Camera-Orienting Device," IEEE International Conference on Robotics and Automation, pp. 781–786). The addition of the redundant spherical joint at point Q increases the stiffness of the mechanism without sacrificing its useful workspace.

Figure 10:
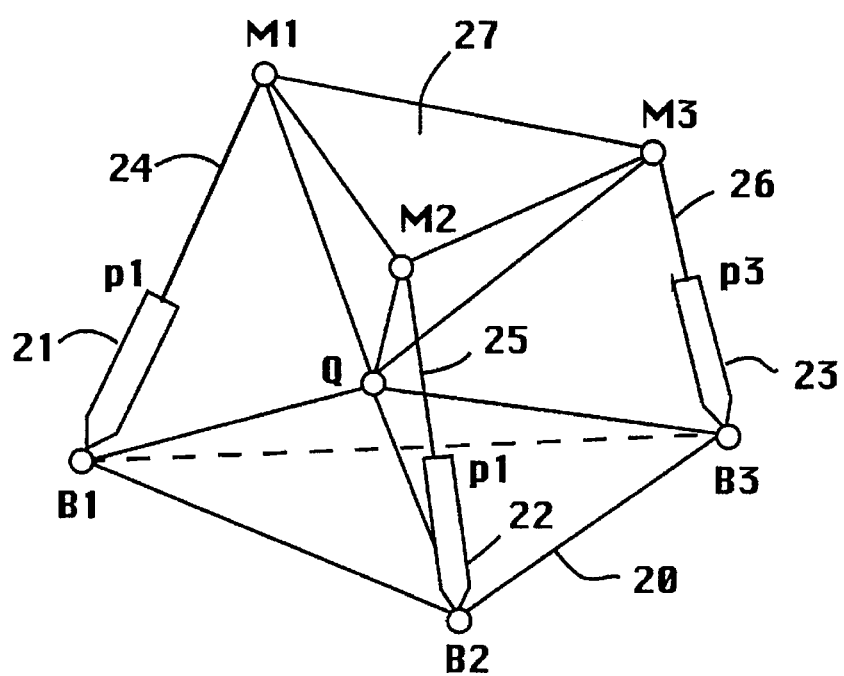
FIG. 10 is a schematic representation of an alternative three-DOF spherical mechanism incorporating spherical and prismatic joints.

An alternative construction of a three-DOF orientation mechanism is shown in FIG. 10 wherein three legs are movably connected to a moving platform 27 and a base platform 20 by spherical joints denoted as M1, M2, M3 and B1, B2, B3, respectively, and wherein each leg is comprised of two members constrained by a prismatic joint. Furthermore, the moving platform 27 is connected to the base platform 20 by a spherical joint at point Q. Rotation of the moving platform is controlled by extending or retracting the prismatic joints. This mechanism was reported by Gosselin and Sefrioui (Gosselin, C., and Sefrioui, J., 1992, "Determination of Singularity Loci of Spherical Three-Degree-of-Freedom Parallel Manipulators," ASME Mechanisms Conference, DE-Vol. 45, Robotics, Spatial Mechanisms, and Mechanical Systems, pp. 329–335). This present invention incorporates mostly revolute joints and one spherical joint to eliminate the disadvantages associated with spherical joints.

Figure 5:
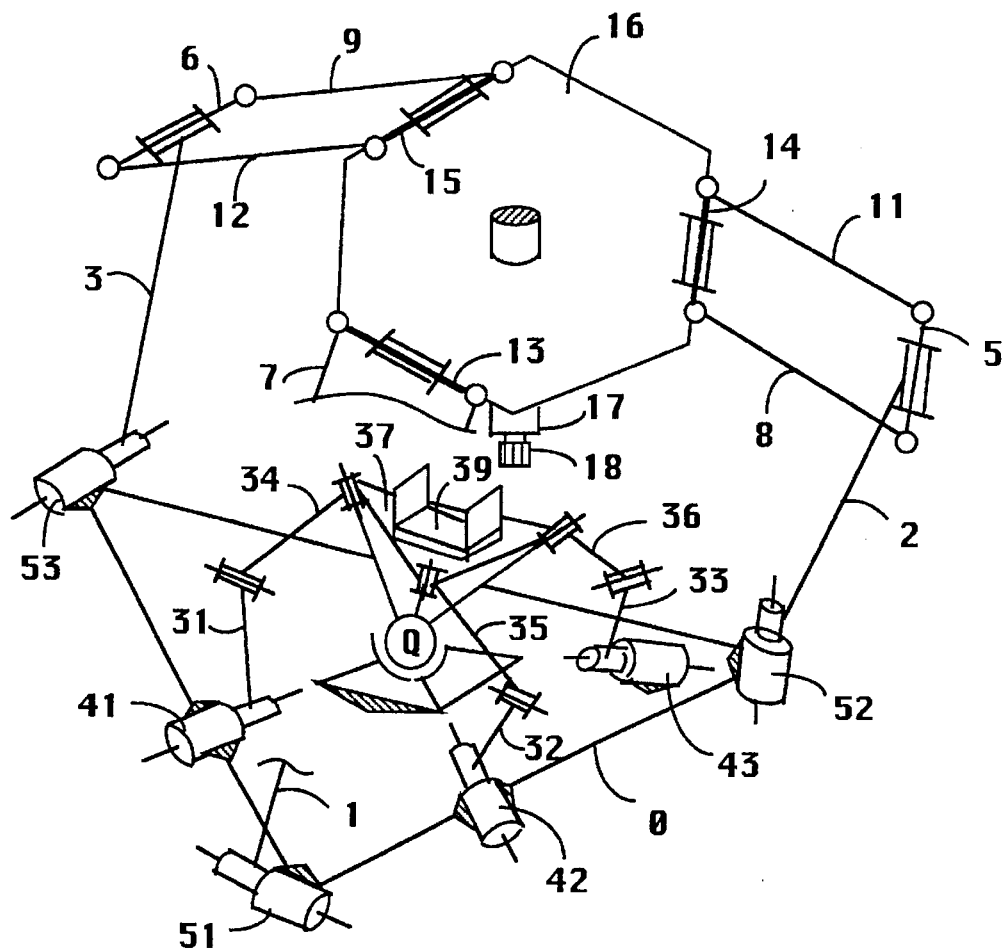
FIG. 5 is a schematic illustration of a six-DOF cooperating machine tool.

A hybrid cooperating machine tool is formed by mounting the base platform 30 of the orientation mechanism on the fixed base 0 of the position mechanism as depicted in FIG. 5. A spindle 17 is attached to the translation platform 16 for holding a cutting tool 18, while a gripping mechanism 39 is attached to the rotation platform 37 for holding a workpiece. This invention makes three dimensional free-form cutting of a workpiece possible. Because of the hybrid parallel construction, the present invention has the following advantages:

1. It has closed-form direct and inverse kinematics solutions.
2. The position and orientation problems are completely decoupled.
3. Its workspace is substantially larger than the prior art.
4. Revolute joints can be precisely made at low cost.

Note that none of the existing parallel manipulators has the decoupled position and orientation characteristic of the present invention.

ALTERNATIVE EMBODIMENTS OF THE INVENTION

A hybrid parallel-serial machine tool can be formed by attaching the base platform 30 of the orientation mechanism to the translation platform 16 of the position mechanism. In this case, the spindle or an end-effector will be attached to the rotation platform 37 of the orientation mechanism to perform six-axis machining or manipulation of an object. Since manipulation of the position is independent of the orientation, the position and orientation problems are completely decoupled. All the advantages of a hybrid coordinating machine tool still apply to this design.

Other potential applications include: (a) a five-DOF hybrid parallel-serial manipulator constructed by mounting a two-DOF rotation mechanism on the translation platform 16 of the three-DOF position mechanism, (b) a five-DOF hybrid cooperating machine constructed by mounting the base platform of a two-DOF orientation mechanism on the fixed base 0 of the three-DOF position mechanism, and (c) a four-DOF manipulator constructed by mounting a one-DOF wrist on the translation platform 16 of the position mechanism.

Figure 6:
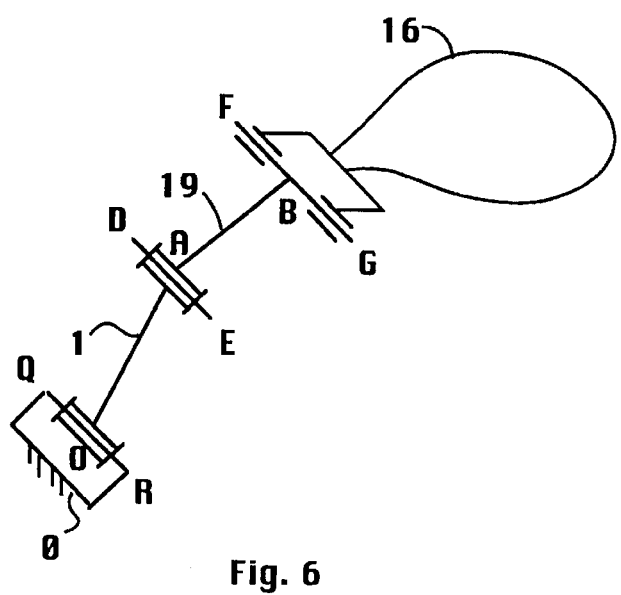
FIG. 6 is an alternative construction of a limb which connects a translation platform to a fixed base by a cylindrical joint followed by a first revolute joint and a second revolute joint.
Figure 7:
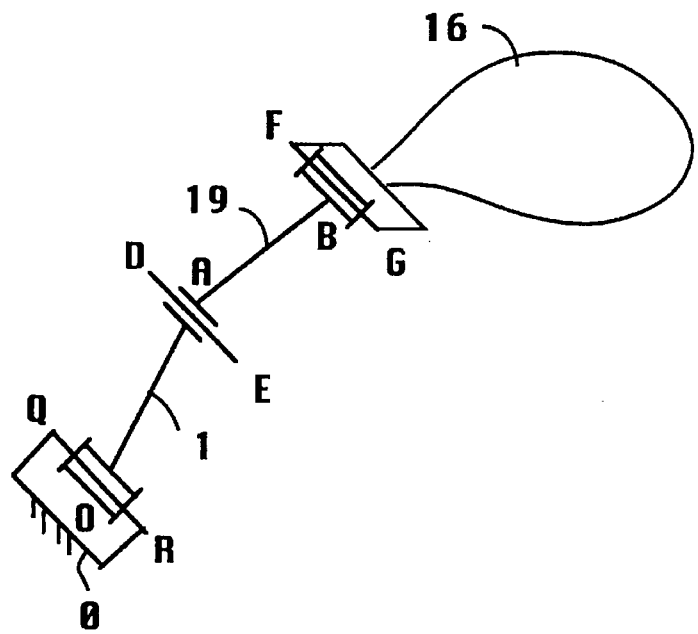
FIG. 7 is another alternative construction of a limb which connects a translation platform to a fixed base by a first revolute joint followed by a cylindrical joint and then a second revolute joint.
Figure 8:
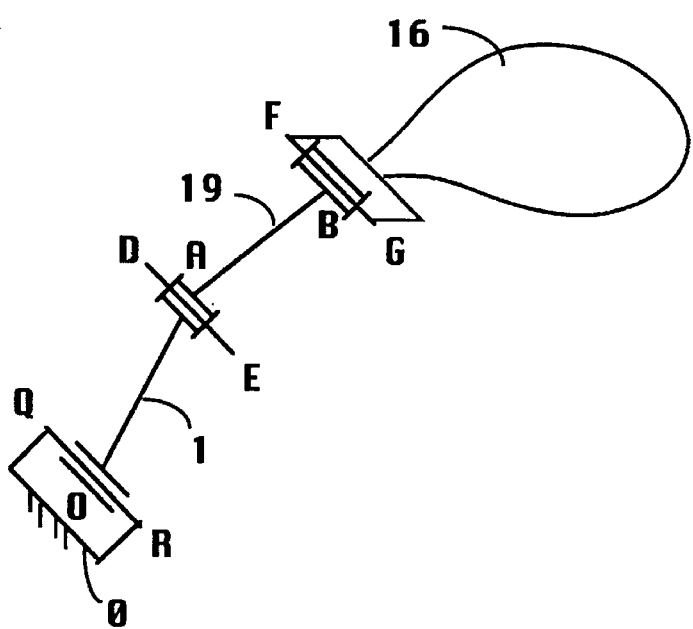
FIG. 8 is still another alternative construction of a limb which connects a translation platform to a fixed base by a first revolute followed by a second revolute joint and then a cylindrical joint.
Figure 9:
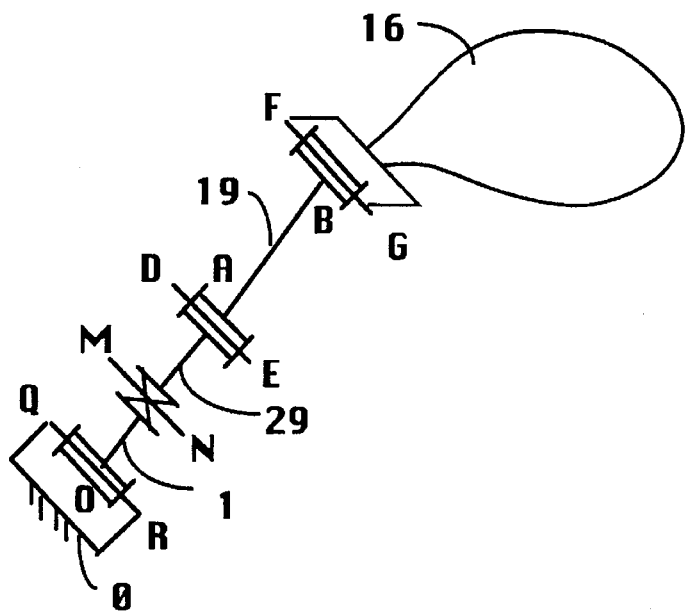
FIG. 9 is still another alternative construction of a limb obtained by replacing the cylindrical joint in FIG. 8 by a revolute joint and a prismatic joint with an added intermediate member.

The parallelogram depicted in the preferred embodiment illustrated in FIG. 2 can be substituted by a single link 18 as illustrated in FIGS. 6 through 8, with one of the three parallel revolute joints located at DE, FG, and QR replaced by a cylindrical joint. A cylindrical joint permits two connected members to rotate and translate with respect to each other about a common joint axis. Additionally, a cylindrical joint can be replaced by two parallel revolute and prismatic joints. A prismatic joint permits only translational motion between two connected members. FIG. 9 demonstrates one such alternation.

For the alternative limb constructions illustrated in FIG. 6 through 9, a linear actuator can be used to control the translation of a cylindrical joint or a prismatic joint. However, it should be noted that only two of the three translational degrees-of-freedom can be controlled independently.

Although the position mechanism illustrated in FIG. 1 has three limbs, theoretically any number of limbs that is greater than one can be employed to achieve the same purpose. When only two limbs are used, it will be necessary to incorporate two actuators in one of the limbs. When four or more limbs are used, only three of the limbs need to be actuated while the others simply provide extra rigidity to the mechanism without changing its mobility. It should be noted that the placement of actuators can be arbitrarily so long as they comply with the mobility criteria of the mechanism. Both rotary and linear actuators can be incorporated into the mechanisms. For example, a linear ball screw or hydraulic actuator can be installed between the fixed base 0 and the link 1 of the position mechanism shown in FIG. 1 to control the rotation of link 1.

While the invention has been described by reference to certain specific embodiments and configurations, it should be understood that various changes could be made without departing from the spirit and scope of the inventive concepts described. Accordingly, it is intended that the invention not be limited to the described embodiments but that it has the full scope permitted by the language of the following claims.

The embodiments of the invention in which an exclusive property or privilege is claimed are defined as follows:

1. A multi-degree-of-freedom hybrid machine tool comprising:

a position mechanism having a translation platform movably connected to a fixed base by several limbs for manipulating the position but not the orientation of said translation platform;

an orientation mechanism having a rotation platform movably connected to a base member by several legs for manipulating the orientation but not the position of said rotation platform;

said base member of said orientation mechanism rigidly attached to said fixed base of said position mechanism;

a spindle attached to said translation platform of said position mechanism for mounting a cutting tool; and a gripping mechanism attached to said rotation platform of said orientation mechanism for mounting a workpiece.

2. The device of claim 1 wherein the attachment points of said spindle and said gripping mechanism are interchanged.

3. A multi-degree-of-freedom hybrid machine tool comprising:

a position mechanism having a translation platform movably connected to a fixed base by several limbs for manipulating the position but not the orientation of said translation platform;

an orientation mechanism having a rotation platform movably connected to a base member by several legs for manipulating the orientation but not the position of said rotation platform;

said base member of said orientation mechanism rigidly attached to said translation platform of said position mechanism;

a spindle attached to said rotation platform of said orientation mechanism for mounting a cutting tool; and a gripping mechanism attached to said fixed base of said position mechanism for mounting a workpiece.

4. The device of claim 3 wherein the attachment points of said spindle and said gripping mechanism are interchanged.

5. A three-degree-of-freedom position mechanism comprising:

three limbs each having an upper arm and a forearm;

each said upper arm of said limbs comprising a planar four-bar parallelogram;

each said planar four-bar parallelogram of said upper arm having a first link, a second link, a third link, and a fourth link movably connected in a closed loop;

said first link of each said planar four-bar parallelogram movably attached to a translation platform by a first revolute joint at non-collinear points on said translation platform;

each said forearm of said limbs having a first end and a second and;

said third link of each said planar parallelogram movably attached to said first end of said forearm by a second revolute joint;

said second end of each said forearm movably connected to a fixed base by a third revolute joint at non-collinear points on said fixed base;

said first, second, and third revolute joints being parallel to one another and perpendicular to the rotation axes of said planar four-bar parallelogram;

driver means affixed to said fixed base and movably attached to each said second end of said forearm for providing rotation to each said forearm thereby manipulating the position of said translation platform; and said translation platform of said position mechanism having a constant orientation with respect to said fixed base.

6. A three-degree-of-freedom position mechanism comprising:

three limbs each having an upper arm and a forearm;

each said upper arm of said limbs having a first end and a second end;

each said forearm of said limbs having a first end and a second end;

said first end of said upper arm movably attached to a translation platform by a cylindrical joint at non-collinear points on said translation platform;

said first end of said forearm movably attached to said second end of said upper arm by a first revolute joint;

said second end of said forearm movably attached to a fixed base by a second revolute joint at non-collinear points on said fixed base;

said cylindrical joint, first revolute joint, and second revolute joint being parallel to one another;

driver means affixed to said fixed base and movably attached to each said second end of said forearm for providing rotation to each said forearm thereby manipulating the position of said translation platform; and said translation platform of said position mechanism having a constant orientation with respect to said fixed base.

7. The device of claim 6 wherein said cylindrical joint and said first revolute joint are interchanged.

8. The device of claim 6 wherein said cylindrical joint and said second revolute joint are interchanged.

9. The device of claim 6 wherein said cylindrical joint is substituted by a revolute joint and a prismatic joint with an added intermediate member.

10. The device of claim 7 wherein said cylindrical joint is substituted by a revolute joint and a prismatic joint with an added intermediate member.

11. The device of claim 8 wherein said cylindrical joint is substituted by a revolute joint and a prismatic joint with an added intermediate member.

12. A three-degree-of-freedom orientation mechanism comprising:

three legs each having an upper member and a lower member;

each said upper member of said legs having a first end and a second end;

each said lower member of said legs having a first end and a second end;

said first end of said upper member movably attached to a rotation platform by a first revolute joint at non-collinear points on said rotation platform;

said first end of said lower member movably attached to said second end of said upper member by a second revolute joint;

said second end of said lower member movably attached to a base member by a third revolute joint at non-collinear points on said base member;

said rotation platform movably attached to said base member by a spherical joint;

said first, second, and third revolute joints intersecting at the center of said spherical joint;

driver means affixed to said base member and movably attached to each said lower member of said legs for providing rotation to each said lower member thereby manipulating the orientation of said rotation platform; and said rotation platform of said orientation mechanism having a point fixed on said base member.

* * * * *